United States Patent

[11] 3,616,305

[72] Inventor Jean P. Arbez
Paris, France
[21] Appl. No. 670,911
[22] Filed Sept. 27, 1967
[45] Patented Oct. 26, 1971
[73] Assignee Etablissements Eugene Arbez
Paris, France
[32] Priority Jan. 18, 1967
[33] France
[31] 91631

[54] PROCESS FOR DEPOSITING LEAD
5 Claims, 2 Drawing Figs.
[52] U.S. Cl. ..................................................... 204/53,
204/297
[51] Int. Cl. ..................................................... C23b 5/16
[50] Field of Search ............................................ 204/DIG. 7,
27, 53, 15, 286, 288, 297

[56] References Cited
UNITED STATES PATENTS
3,329,589 7/1967 Lebrun ......................... 204/53
3,429,786 2/1969 Kubik ........................... 204/297
2,908,740 10/1959 Chapman ..................... 204/15
2,859,166 11/1958 Grigger ........................ 204/153 CD
2,713,555 7/1955 Neely ............................ 204/286
1,892,413 12/1932 Teats et al. ................... 204/286

Primary Examiner—John H. Mack
Assistant Examiner—Sidney S. Kanter
Attorney—Mason, Kolehmainen, Rathburn & Wyss ABSTRACT: A method for the controlled electrodeposition of lead to a desired thickness on a cathode plate in an electrolytic bath including the placement of a cathode disposed in spaced apart, vertical, parallel relation between a pair of anode plates in said bath, supporting said cathode and anodes with electrically conductive support frames around the entire peripheral edges thereof, and providing insulating material on the outer surfaces of said support frames exposed to said electrolytic bath to form an even, homogeneous electric field between the anodes and cathode for the deposit of lead coating on the cathode without edge effects.

PATENTED OCT 26 1971　　　　　　　　　　　3,616,305

INVENTOR:
JEAN-PIERRE ARBEZ,
BY: Mason, Kolehmainen, Rathburn & Wyss,
ATTORNEYS.

PROCESS FOR DEPOSITING LEAD

Copperplate printing of metal plates is already used for reproducing a text, and in particular, in addressing machines for mail. An application to medicine consists of marking patients' names on radiographic plates, or else in metallurgy for identifying parts or samples studied by gammagraphy or radiography.

In examples bringing radiations into action, it is necessary that the marking metal plate has absorption differences of radiation distributed according to the text, so that the latter appears on the negatives with a sufficient contrast.

These latter considerations are naturally valid for all applications that bring radiation and its absorption into action, the description of the examples given above not being restrictive.

Plates ordinarily used are formed by a metal support transparent to radiation, covered with a lead film of given thickness, applied to the support by rolling, the assembly then being stamped according to the text to be reproduced.

The dieing out determines a thinning of the lead film level with the characters, thus making the metal screen transparent to the radiation utilized.

The usual methods of rolling for fixing the lead coat, do not enable a sufficient adherence to be obtained, nor the thickness to be suitably controlled. Rolling to thickness in the region of one-tenth of a millimeter is actually unattainable in mass production, if uniform results are desired, and in particular, a homogeneous distribution of the thickness over the entire extent of the plate.

The invention has the object of obviating these disadvantages and relates, to this end, to a process for depositing a lead coating on solid plates by electrical means, in which the positive electrodes formed by lead and the negative electrode made by the plate to be coated are placed in a suitable electrolyte bath, the process consisting of providing the peripheric edges of the electrodes with an insulation, in order to produce a homogeneous electric field, which will enable an even, homogeneous and coherent lead deposit to be obtained on the negative plate.

Other objects and characteristics of the invention will be revealed by the text of the description, claims and drawings attached, in which:

According to the invention, a particular technique has been devised for preparing plates for coating, so as to obtain a sufficient adherence of the lead film well accommodated to dieing out.

The present process consists more particularly of the depositing by electrolysis of a lead coating on a plate of steel strip.

Thanks to a suitable arrangement of the anodes and the utilizing of insulating masks, it is actually possible to produce a very homogeneous distribution of the electric field, thus insuring a very accurate regularity of the quantity of lead deposited. With regard to the absolute value of the thickness itself, this may vary, according to requirements, from a few microns to some millimeters The electrolysis bath is so arranged that the plate to be covered with lead is placed in cathode between two lead plates of appreciably the same dimensions, or larger, acting as anodes. The assembly is placed vertically in the bath, the cathode-anode distance being a few centimeters. To obtain a homogeneous deposit over the entire cathodic surface, it is necessary to distribute the current by conducting frames covering the periphery of the cathode, the faces of frames in contact with the electrolysis being insulated according to the invention by means of an insulating varnish, unattackable in the electrolyte, or by means of a second insulating frame of plastic superimposed on the conducting frame.

This thickness of the anodes must be so calculated that the ohmic drop in the lead of which they are made, is negligible. Like for the cathodes, the distributing of the current can be conveyed by a frame of the same type as that described above.

Figure 1:
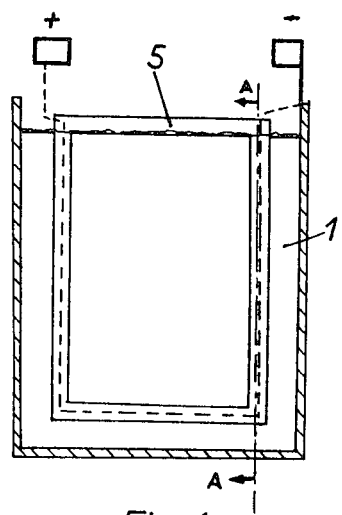
FIG. 1 is a view in perspective, partially sectioned, of a plate to be coated, whose peripheral edges are covered with a conductor frame and an insulating coat in accordance with the invention.
Figure 2:
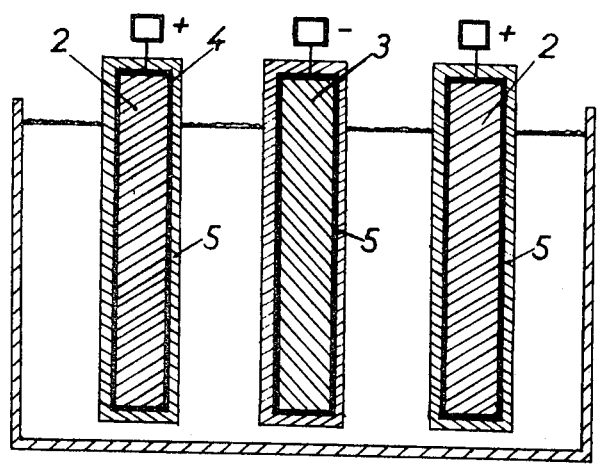
FIG. 2 is a view in perspective showing the respective positions of the anodes and cathodes in an electrolysis tank in accordance with the invention.

In the examples shown in FIGS. 1 and 2, the electrolysis bath 1 contains the anodes 2 of the contributing metal and a cathode 3 placed between the two anodes, said cathode 3 being the plate to be covered.

Each of the electrodes 2 and 3 is provided with an insulated conducting frame 4 connected to the supply terminals for electric current.

According to the invention, the conducting frame is covered with an insulation 5.

The insulation is advantageously made of a varnish resisting electrolysis; this particular arrangement of the electrodes enables "border effects" to be suppressed and to obtain, on the electrode to be treated, a homogeneous distribution of the electric field and current density enabling the depositing of a perfectly even lead coating to be obtained, free from cracks or waves, whose thickness is perfectly controlable, and more particularly as a function of the duration of electrolysis.

The lead coating thus deposited on the plates has a particularly malleable structure, capable of being easily stamped, whatever the thickness of the lead coating, which enables address plates to be made that can be produced at a high rate of manufacture, owing to the rapidity and simplicity of the present process.

The process according to the invention is described, by way of nonrestrictive example, in the example 1 given below:

EXAMPLE 1.

For making plates, one starts with galvanized steel strip, produced by electrolysis or by immersion. The plates are then degreased and pickled, in a bath of known type, completed as follows:

Detergent degreasing and pickling bath 9 to 10 percent
Tensio-active additive 6 to 10 percent
Temperature 40° to 80° C.
PH 12 to 13
Immersion 1 to 10 minutes.

The strip plates are then mounted in insulating masks which, while protecting the edges, thus avoid the "border effects" well known in electrolysis technique. The plates thus mounted and placed in cathode in lead-coating baths with the following composition:

Basic carbonate of lead 129 g./litre
Hydrofluoric acid at 50% 240 g./litre
Boric acid 106 g./litre
Gelatin 0.2 g./litre It appears that these very ample conditions, allow, for one and the same installation, to follow in a very flexible manner, much more flexible than with a rolling-mill, the variations of demands and thus lower the cost price.

The plates are then rinsed, released from their frames and stored with a view to their subsequent cutting and stamping.

EXAMPLE 2

Lead-coating is considered as a continuous process by uncoiling the strip between two anodic plates, the edges being naturally protected, for example, by previous varnishing, or by sliding the strip between two insulating masks, of suitable shape. In this case, stamping can take place immediately after electrolysis operations, the operation could then go on continuously and could be automatized.

What we claim is:

1. A method for the controlled electrodeposition of lead to a desired thickness on a solid plate cathode in an electrolytic bath comprising the steps of maintaining said cathode disposed in spaced apart parallel relation from an anode plate in said bath, supporting said cathode and anode in spaced apart parallel relation in said bath with conductive support frames extending around the entire peripheral edge thereof, and providing insulating material on the outer surfaces of said support frames which are exposed to said electrolytic bath, and supplying direct current voltage across said frames thereby forming an even, homogeneous, electric field between the cathode and anode plates for depositing a lead coating on the cathode.

2. The method of claim 1 wherein said insulating material comprises an insulating varnish resistant to the electrolyte in said bath.

3. The method of claim 1 wherein said insulating material comprises second, outer covering frames of plastic material resistant to said electrolyte and covering the outer surface of said conducting frames exposed to said electrolytic bath.

4. The method of claim 1 wherein said anode includes a planar surface area defined within the periphery of said peripheral frame substantially equal to or larger than an opposite parallel facing surface area of said cathode.

5. The method of claim 1 wherein said anode includes a planar sheet of lead of substantial thickness thereby minimizing voltage drop in said anode in comparison with the voltage drop across said bath between said cathode and an anode.

* * * * *